Sept. 23, 1924.  V. WILLOUGHBY  1,509,121
MULTIPLE UNIT TANK CAR
Filed Feb. 1, 1924  2 Sheets-Sheet 1
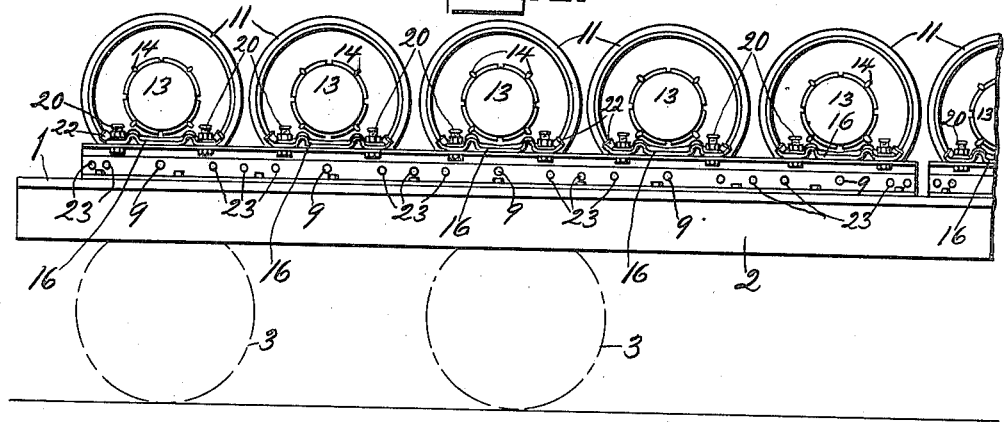
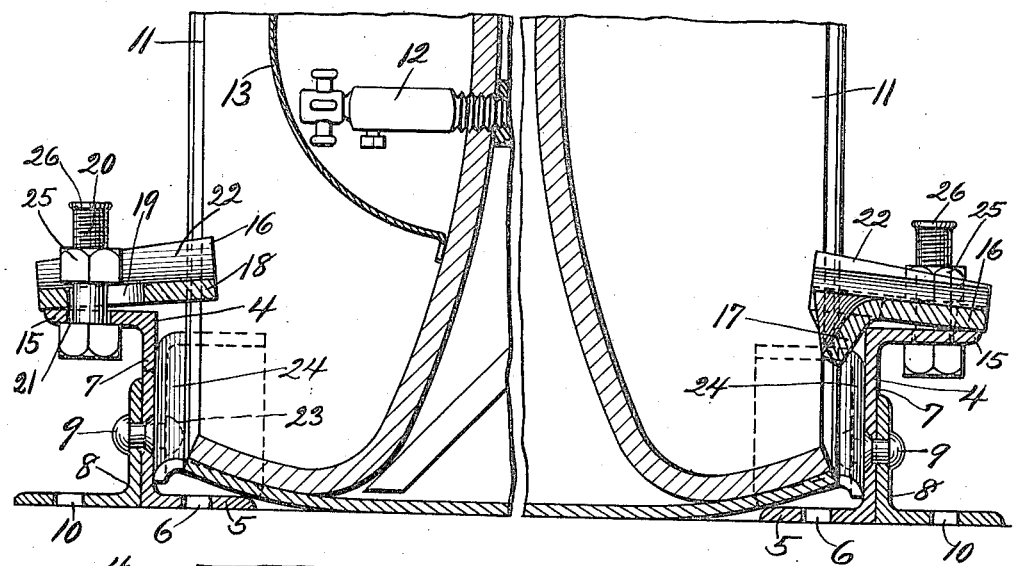
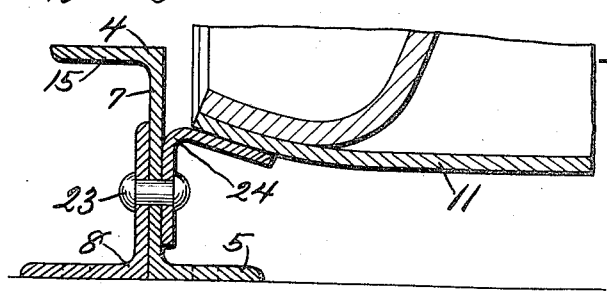
INVENTOR
Victor Willoughby
BY J. H. Libes
ATTORNEY

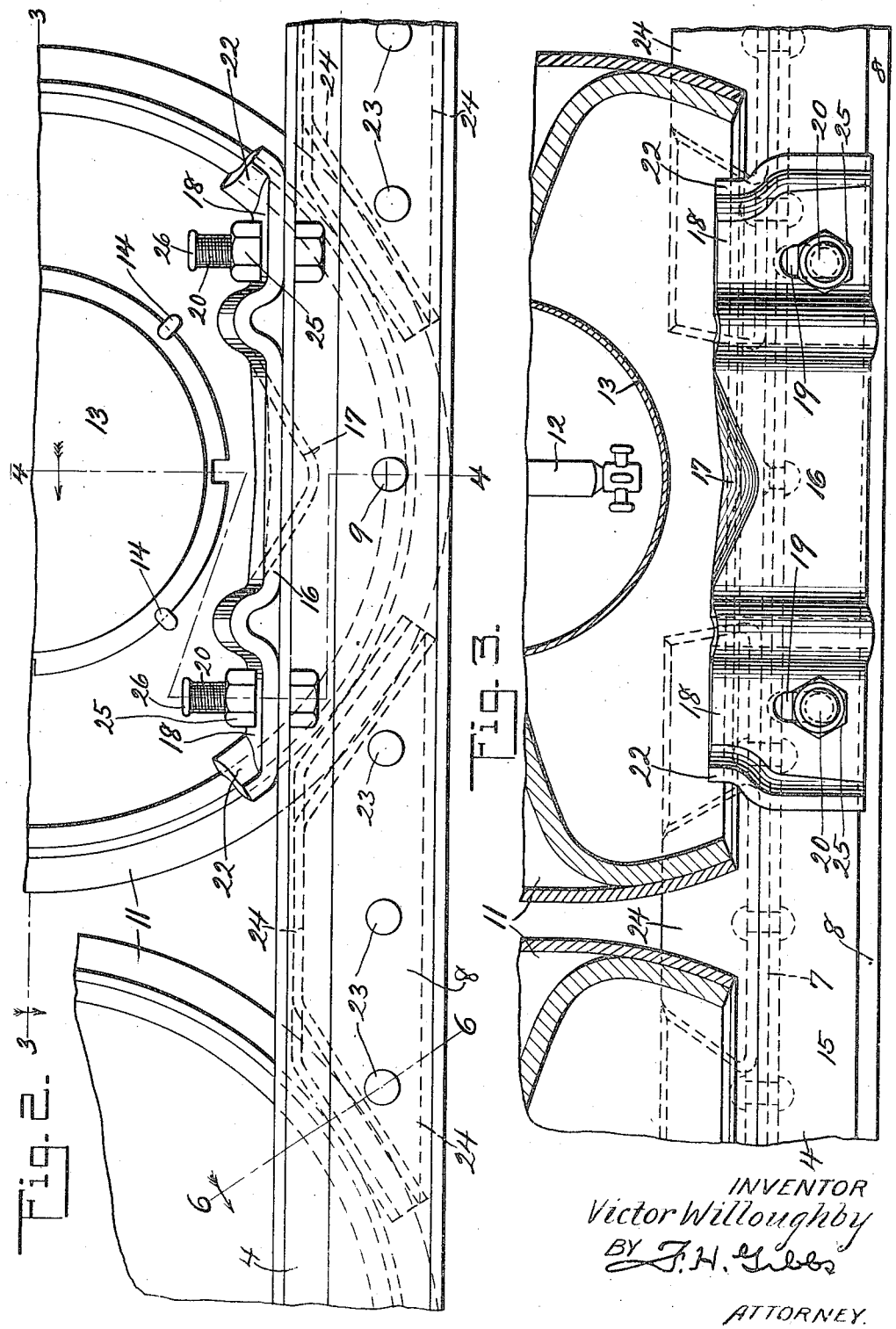

Patented Sept. 23, 1924.

1,509,121

UNITED STATES PATENT OFFICE.

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

MULTIPLE-UNIT TANK CAR.

Application filed February 1, 1924. Serial No. 689,897.

*To all whom it may concern:*

Be it known that I, VICTOR WILLOUGHBY, residing at Ridgewood, in the county of Bergen and State of New Jersey, and being a citizen of the United States, have invented certain new and useful Improvements in a Multiple-Unit Tank Car, of which the following is a full, clear, and exact description, such as will enable other skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a side elevation of a multiple unit tank car constructed in accordance with this invention, the position of the truck being indicated only;

Fig. 2 is a fragmentary side elevation on a larger scale showing the manner of securing the containers to the car body;

Fig. 3 is a horizontal section taken on the line 3—3 of Fig. 2;

Fig. 4 is a partial vertical section of one end of a container and its securing means taken substantially on the line 4—4 of Fig. 2;

Fig. 5 is a partial central vertical section of the opposite end of the container and its securing means; and Fig. 6 is a section taken substantially on the line 6—6 of Fig. 2.

It is an object of this invention to provide an improved multiple unit tank car and it is also an object of this invention to provide improved means for securing tank units to the car body such that a multiple unit tank car can be formed by securing tank units to the floor of a car of ordinary construction. It is also an object of this invention to provide securing means which may be readily operated to secure or release the tank units and which are of simple and rugged construction, and so formed that parts cannot be lost when the securing means are not holding tank units in position.

In the drawings, this invention is shown applied to a flat car of ordinary construction having a floor 1 carried by a frame 2 which is supported upon trucks (not shown) carried by wheels indicated by the broken lines at 3. To the floor 1 are secured spaced parallel members 4 shown in the drawings as being formed of Z-bars having their lower flanges 5 turned inwardly and secured to the car floor by bolts or other suitable securing means which are inserted through the openings 6. The members 4 may be of any desired length being shown in Fig. 1 as long enough to receive five tank units. To the webs 7, of the members 4, angle members 8 are secured by rivets 9 and 23, the angle members having a flange projecting outwardly in engagement with the car floor 1 and secured thereto by bolts in openings 10. Between the spaced members 4 are placed a plurality of tank units 11 which rest upon the floor 1 and have their ends adjacent to the spaced members 4, the head of one end of each tank unit being provided with a discharge outlet valve 12 protected by covering 13, held in position by the clips 14.

To the upper outwardly projecting flanges 15 of the Z-bars 4 are secured pressed securing members 16 which have their center portions provided with tapered inclined lips or flanges 17; substantially flat portions 18 on opposite sides of and spaced from the flanged portions and provided with slots 19 to receive the bolts 20 which engage in openings 21 in the upper flanges 15 of the Z-bar 4; and ends 22 which are bent upwardly and flared outwardly to conform with the shape of the ends of the tank units. To the webs of the Z-bar members 4 rivets 23 also secure flanged plates 24 of substantially triangular shape and positioned so as to be between the tank units 11 so that when the tank units 11 are secured in position by the securing members 16 the flanges of the plates 24 will be in engagement with the ends of the tank units 11 and serve as chocks for the tank units, the plates 24 intermediate the length of the Z-bars 4 being provided with flanges which engage with the tank units 11 upon each side of the plates 24, while the plates 24 at the ends of the Z-bar members 4, which are substantially halves of the intermediate plates, engage with the end tank units only.

Assuming the tank units in place on the floor 1 with their ends in engagement with the flanges of the plates 24, the securing members 16 are brought into engagement with the ends of the tank units by tightening the nuts 25 on the bolts 20, forcing the securing members 16 into engagement with the top flanges 15 of the Z-bar members 4, at the same time forcing the securing members 16 inwardly into engagement with the ends of the containers 11 by the engagement of the tapered inclined flanges 17 of the securing members 16 with the Z-bar members 4, the length of the slots 19 in the securing members 16 permitting sufficient movement of the securing members 16 that their ends 22 will engage with the ends of the tank units 11. It will be noted that the ends 22 of the securing members 16 engage with the ends of the tank units in the lower halves of the ends of the tank units so that movement of the tank units in any direction is resisted. The tendency of the tank units to roll on the floor 1 during the operation of the car will also be resisted by the flanges of the plates 24, as well as by the securing members 16.

In order to release the tank units 11, the nuts 25 will be unscrewed, releasing the pressure on the securing members 16 and permitting the securing members 16 to be raised slightly and drawn back from the tank units 11 the length of the slot 19, whereupon the ends 22 of the securing members 16 will be clear of the ends of the tank units 11, and may be freely removed from the car. The inclined flanges 17 do not project inwardly beyond the ends 22 so that the flanges 17 will be clear of the tank units when the ends of the securing members 16 are clear. It will be noted that the securing members 16 are the only members it is necessary to loosen in order that the tank units may be removed from the car, and in order to prevent loss of these members and the nuts 25 and bolts 20, the bolts 20 have their threaded ends headed slightly as at 26 to prevent removal of the nuts 25 from the bolts 20, thus preventing loss of any part of the securing means.

What is claimed is:

1. A multiple unit tank car comprising a floor, spaced longitudinal members secured to said floor, tank units carried by said floor between said longitudinal members and securing members carried by said longitudinal members and adapted to exert a wedging action on the ends of said tank units.

2. A multiple unit tank car comprising a support, spaced longitudinal members carried by said support, tank units mounted on said support between the said longitudinal members and securing means carried by said longitudinal members adapted to engage the ends of said tank units.

3. A multiple unit tank car comprising a floor, spaced members carried by said floor, tank units carried by said floor between said spaced members, securing members having flanges engaging said spaced members and flared ends engaging said tank units and means securing said securing members to said spaced members.

4. A multiple unit tank car comprising a a floor, spaced members carried by said floor, tank units carried by said floor between said spaced members, chocking means for said tank units carried by said spaced members, securing members having flanges engaging said spaced members and flared ends engaging said tank units and means securing said securing members to said spaced members.

5. A multiple unit tank car comprising a floor, spaced longitudinal members secured to said floor, tank units carried by said floor between said longitudinal members and securing means for said tank units carried by said longitudinal members adapted to engage the ends of said tank units.

6. A multiple unit tank car comprising a floor, spaced members carried by said floor, tank units carried by said floor between said spaced members and securing means for said tank units adapted to be forced into engagement with said tank units by engagement with said spaced members.

7. A multiple unit tank car comprising a floor, spaced members carried by said floor, tank units carried by said floor between said spaced members, chocking means for said tank units carried by said spaced members and securing means for said tank units carried by said spaced members and adapted to be forced into engagement with said tank units by engagement with said spaced members.

8. A multiple unit tank car comprising a supporting means, spaced members carried by said supporting means, tank units carried by said supporting means, securing members having their ends flared to engage said tank units and inclined flanges engaging said spaced members and means adapted to force said securing members into engagement with said tank units and said spaced members.

9. A multiple unit tank car comprising a supporting means, spaced members carried by said supporting means, tank units carried by said supporting means, chocking means for said tank units carried by said spaced members, securing members having their ends flared to engage the ends of said tank units and inclined flanges engaging said spaced members and means adapted to force said securing members into engagement with said spaced members and the ends of said tank units.

10. A multiple unit tank car comprising a supporting means, spaced flanged members having flanges secured to said supporting means, tank units carried by said supporting means, chocking means for said tank units carried by the webs of said spaced members and securing means for said tank units carried by flanges of said spaced members.

11. A multiple unit tank car comprising a supporting means, spaced flanged members having flanges secured to said supporting means, tank units carried by said supporting means, securing members having inclined flanges engaging said spaced members and their ends flared to engage said tank units and means securing said securing members to flanges of said spaced members adapted to force said securing members into engagement with said spaced members and said tank units.

12. A multiple unit tank car comprising a supporting means, spaced flanged members having their bottom flanges engaging said supporting means, tank units carried by said supporting means and securing means for said tank units carried by the top flanges of said spaced members.

In witness whereof I have hereunto set my hand in the presence of two witnesses.

VICTOR WILLOUGHBY.

Witnesses:
 FLORENCE HARING.
 R. W. SMITH.